US007213502B2

(12) United States Patent
Vonderwell

(10) Patent No.: US 7,213,502 B2
(45) Date of Patent: May 8, 2007

(54) ROBUSTLY STABLE SERVO-CONTROLLED METERING POPPET VALVE

(75) Inventor: Mark Vonderwell, Dunlap, IL (US)

(73) Assignees: Caterpillar Inc, Peoria, IL (US); Shin Caterpillar Mitsubishi Ltd (JP)

(*) Notice: Subject to any disclaimer, the term of this patent is extended or adjusted under 35 U.S.C. 154(b) by 75 days.

(21) Appl. No.: 11/223,619

(22) Filed: Sep. 9, 2005

(65) Prior Publication Data

US 2007/0056439 A1 Mar. 15, 2007

(51) Int. Cl.
*F16D 31/02* (2006.01)

(52) U.S. Cl. ............................ 91/454; 91/459; 91/433; 60/461

(58) Field of Classification Search .................. 91/454, 91/456, 461, 433, 459; 60/459, 461
See application file for complete search history.

(56) References Cited

U.S. PATENT DOCUMENTS 3,608,435 A * 9/1971 Conabee et al. .............. 91/454
4,417,502 A * 11/1983 Shore .......................... 91/447
4,955,283 A * 9/1990 Hidaka et al. ................ 91/447
5,186,212 A 2/1993 Stephenson et al.
5,571,226 A * 11/1996 Kobayashi ................... 91/421
5,620,026 A 4/1997 Stephenson et al.
5,819,532 A 10/1998 Wang et al.
6,253,658 B1 * 7/2001 Kimura ....................... 91/447
6,745,992 B2 6/2004 Yang et al.
6,869,060 B2 3/2005 Barber et al.

FOREIGN PATENT DOCUMENTS

GB 2 165 372 4/1986
WO WO 00/73665 12/2000
WO WO 2004/077187 9/2004

OTHER PUBLICATIONS

Hongliu Du; An E/H Control Design For Poppet Valves In Hydraulic Systems; ASME International Mechanical Engineering Congress & Exposition, Nov. 17-22, 2002, New Orleans, Louisiana; pp. 141-148; ASME; New York, New York.

* cited by examiner

*Primary Examiner*—Igor Kershteyn
(74) *Attorney, Agent, or Firm*—Liell & McNeil

(57) ABSTRACT

A poppet valve assembly with a control chamber that can be fluidly connected to a number of different hydraulic ports via a pilot valve assembly. The poppet valve assembly includes a poppet valve member whose movement is controlled by filling or draining the control chamber, and which can be hydraulically locked into a given position by fluidly isolating the control chamber from any other hydraulic connections. The poppet valve member includes a control hydraulic surface exposed to fluid pressure in the control chamber. The poppet valve assembly may be part of a valve assembly that includes a plurality of poppet valve assemblies that operably control a hydraulic cylinder connected to an implement of a work machine.

20 Claims, 4 Drawing Sheets

ROBUSTLY STABLE SERVO-CONTROLLED METERING POPPET VALVE

TECHNICAL FIELD

The present disclosure relates generally to valve assemblies, and more particularly to a poppet valve assembly that can hydraulically lock a poppet valve member in one of a plurality of different positions with respect to a valve seat.

BACKGROUND

Poppet valves are used in a variety of hydraulic systems such as those used to control different systems on work machines. A poppet valve typically consists of a housing with at least one input and one output hydraulic port. Inside the housing is a poppet valve member seated in a valve seat such that when the poppet valve member is in contact with the valve seat, the input and the output ports are not fluidly connected. When the poppet valve member is moved away from the valve seat by an actuator, then the input and output ports are fluidly connected and hydraulic fluid can flow across the valve seat. Typically, the housing also contains a control chamber hydraulically connected in a number of different manners, such as a position follower model described in U.S. Pat. No. 6,745,992 B2, a flow amplifying model described in U.S. Pat. No. 5,819,532, or a force feedback model as in U.S. Pat. No. 6,869,060 B2, all of which involve the poppet valve member being exposed to hydraulic pressure on at least one control hydraulic surface. In this manner the motion of the poppet valve member can be at least partially controlled and de-sensitized to differences in pressure between the input and the output ports.

A problem with these methods of controlling the poppet valve member is that the pump and line pressure changes can affect poppet control volume dynamics. This occurs because the control volume is always fluidly connected to the hydraulic system. As the pressure in the system fluctuates, the poppet valve member may move at differing rates due to the hydraulic connections of the ports to the control chamber, making accurate control difficult and unpredictable. This same problem renders it difficult to maintain the poppet valve member at a selected location away from its seat.

One possible solution to this problem is to use spool valves rather than poppet valves in hydraulic systems, such as that described in U.S. Pat. No. 5,186,212. Spool valves include a spool valve member that slides back and forth inside a bore of a housing to open and close fluid ports. An advantage of spool valves is that they are pressure balanced and can therefore be precisely positioned regardless of pressure differences. Spool valves, however, have a disadvantage in that they necessarily have a radial clearance between the spool valve member and the housing, so they inherently leak. This can cause problems when the spool valves are used in work machine applications such as loaders, such as where it might be desirable to keep the loader bucket in a lifted position over a prolonged period of time.

The present disclosure is directed to one or more of the problems set forth above.

SUMMARY OF THE INVENTION

In one aspect, a valve assembly includes a poppet valve assembly fluidly connected to a pilot valve assembly. The poppet valve assembly includes a hydraulic control chamber and a fluid passage, including a valve seat, extending between a first port and a second port. The poppet valve assembly further includes a poppet valve member with a control hydraulic surface exposed to hydraulic pressure inside the control chamber. The poppet valve member has a plurality of positions with different flow areas across the valve seat, and includes a position in which there is no flow area because the poppet valve member is in contact with the valve seat. The pilot valve assembly has a first configuration wherein the control chamber is fluidly connected to the first port, a second configuration wherein the control chamber is fluidly connected to the second port, and a third configuration wherein the control chamber is fluidly isolated from both the first port and the second port.

In another aspect, a machine comprises a chassis and a poppet valve assembly, which includes a head port, a rod port, a pump port and a drain port, attached to the chassis. The machine further includes a hydraulic cylinder fluidly connected to the head port and the rod port. The poppet valve assembly includes a poppet valve member with a control hydraulic surface exposed to fluid pressure in a control chamber, and is movable to a plurality of positions with different flow areas across the valve seat. Further, the machine includes means, such as a pilot valve assembly, for stopping the poppet valve member at each of the plurality of positions at least in part by fluidly isolating the control chamber.

In yet another aspect, a method for operating a valve assembly comprises a step of moving a poppet valve member with respect to a valve seat. This movement is done at least partially by exposing a control hydraulic surface of the poppet valve member to hydraulic pressure in a control chamber. The poppet valve member is stopped at a position away from the valve seat at least partially by fluidly isolating the control chamber.

DETAILED DESCRIPTION

Figure 1:
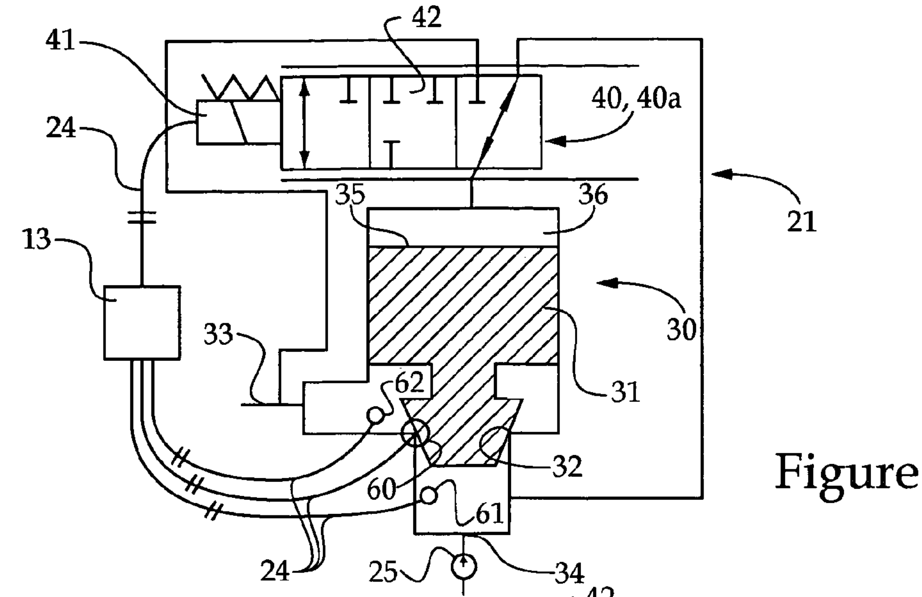
FIG. 1 is a schematic view of the poppet valve assembly fluidly connected to the pilot valve assembly in the first configuration, both of which are electrically connected to the electrical controller, according to the present disclosure.
Figure 2:
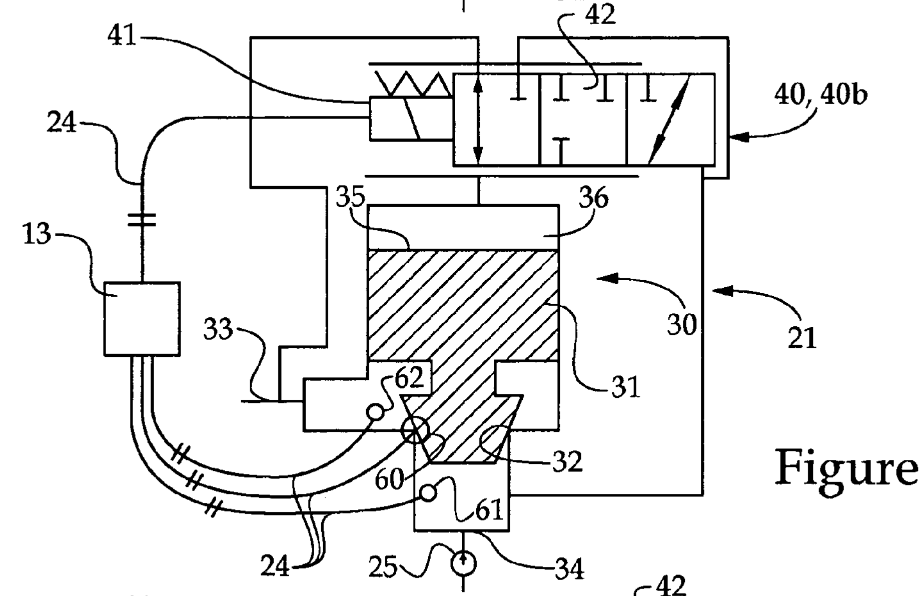
FIG. 2 is a schematic view of the poppet valve assembly of FIG. 1 in the second configuration according to the present disclosure.
Figure 3:
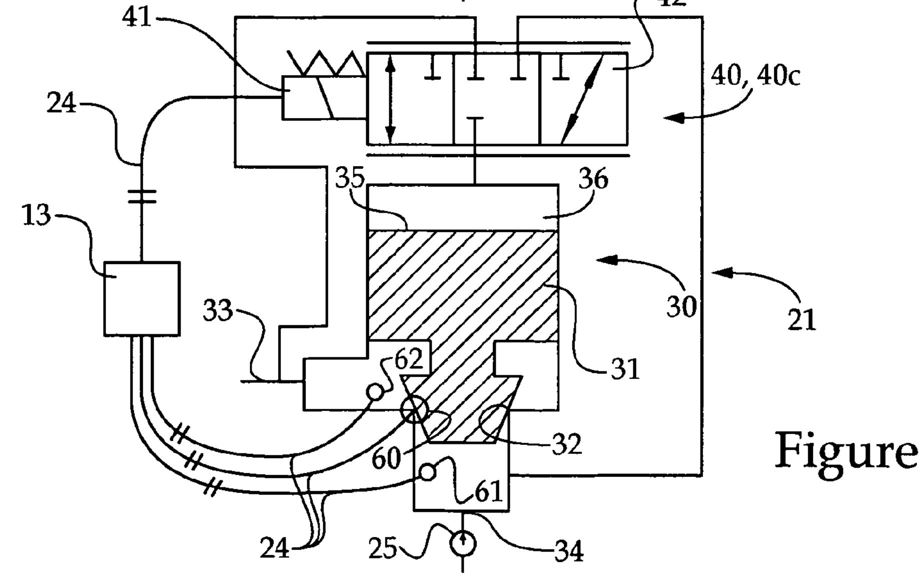
FIG. 3 is a schematic view of the poppet valve assembly of FIGS. 1 and 2 in the third configuration according to the present disclosure.

Referring to FIG. 1, there is shown a valve assembly 21 electrically connected to an electrical controller 13 according to the present disclosure. The valve assembly 21 includes a pilot valve assembly 40 and a poppet valve assembly 30. The poppet valve assembly includes a poppet valve member 31 with a control hydraulic surface 35. Poppet valve member 31 is movable with respect to a valve seat 32, which may be a conical valve seat formed on a valve body. The poppet valve assembly 30 also includes a position sensor 60, such as a linear variable displacement transducer (LVDT) or some other suitable device known to those skilled in the art, electrically connected to the electrical controller 13 to determine the displacement of the poppet valve member 31 with respect to the valve seat 32. The control hydraulic surface 35 is exposed to hydraulic pressure in a control chamber 36 inside the poppet valve assembly 30. The poppet valve assembly 30 further includes an input port 34 connected to a pressure source, such as a pump 25, an output port 33 on an opposite side of the valve seat 32, and a first and second pressure sensor 61, 62 connected to the electrical controller 13 operable to detect a pressure differential across the valve seat 32. The pilot valve assembly 40 includes a pilot valve member 42 and an electrical actuator 41 operably controlled by the electrical controller 13. The actuator 41 could be any suitable actuator including but not limited to a piezo or a solenoid. The pilot valve assembly 40 is shown in a first configuration 40*a* wherein the output port 33 is fluidly isolated from control chamber 36, and the input port 34 is fluidly connected to the control chamber 36 via the pilot valve member 42. The actuator 41 biases the pilot valve assembly 40 to be in the first configuration 40*a* as shown in FIG. 1. FIG. 2 shows the valve assembly 21 in a second configuration 40*b* electrically connected to the electrical controller 13. In the second configuration 40*b*, the input port 34 is fluidly isolated, but the output port 33 is fluidly connected to the control chamber 36 via the pilot valve member 42. FIG. 3 shows a valve assembly 31 in a third configuration 40*c* electrically connected to the electrical controller 13. In the third configuration 40*c*, the control chamber 36 is fluidly isolated from both the input port 34 and the output port 33 by the pilot valve member 42.

It will be appreciated by one skilled in the art that the pilot valve member 42 is shown as a three-way valve by way of example only, and that the spirit and scope of this disclosure includes any such means for connecting the control chamber 36, the input port 34 and the output port 33 in the first configuration 40*a*, the second configuration 40*b* and the third configuration 40*c* as disclosed above. One possible alternative could include a combination of two two-way valves operably coupled to two actuators and the control chamber 36, the input port 34 and the output port 33, respectively. Further, it should be recognized that the actuator 41 described above can include a piezo, a solenoid or any other means of altering the configuration of the pilot valve member 40. In the illustrated embodiment, pilot valve member 40 is a spool, but it could be an appropriately biased poppet valve member. Finally, it should be recognized that the pump 25 connected to the input port 34 is not necessary to the valve assembly 21 as herein disclosed, and is only meant to show an example fluid connection without limitation to scope or spirit of the disclosure. In a similar manner, the position sensor 60, the first pressure sensor 61, and the second pressure sensor 62 are not necessary to ensure correct operation of the disclosure, but are herein included as an example of a desired embodiment.

Figure 4:
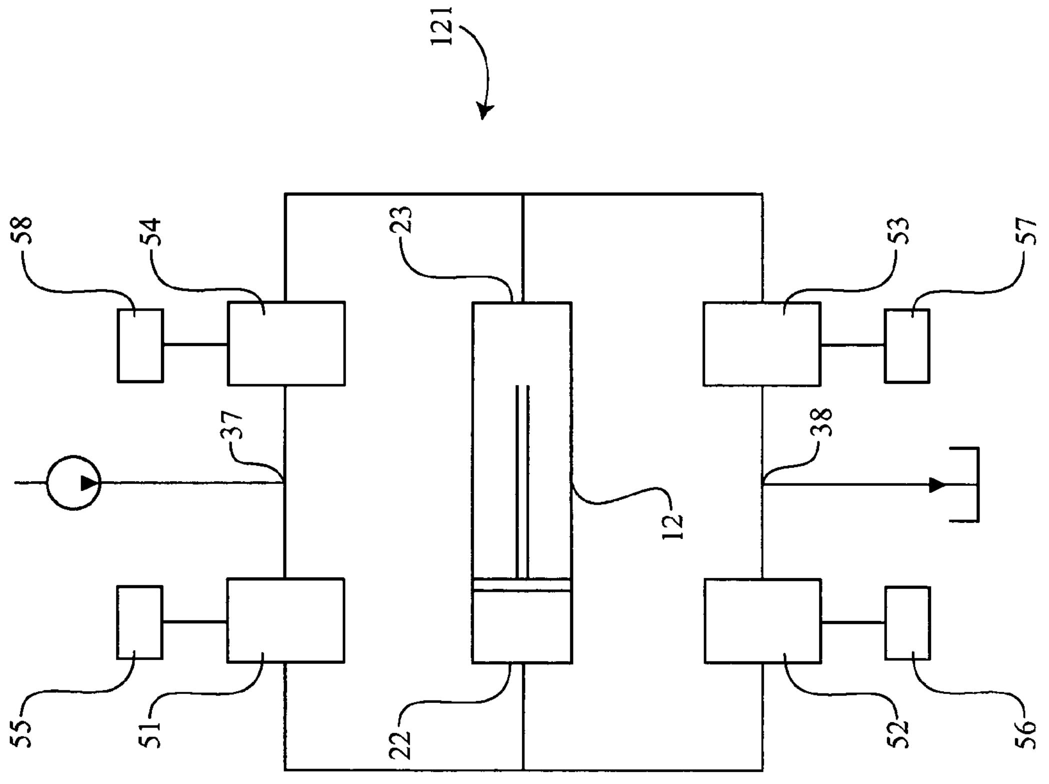
FIG. 4 is a schematic view of the valve assembly that includes a first, second, third, and fourth poppet valve assembly according to FIG. 1 coupled to a hydraulic cylinder according to the present disclosure.

Referring to FIG. 4, there is shown a valve assembly 121 containing a pump port 37 and a drain port 38 wherein like elements are assigned like numbers to the previous Figures. The valve assembly 121 is fluidly connected to a hydraulic cylinder 12 via a head port 22 and a rod port 23. The valve assembly 121 further includes a first poppet valve assembly 51, a second poppet valve assembly 52, a third poppet valve assembly 53, and a fourth poppet valve assembly 54 each with a respective first pilot valve assembly 56, a second pilot valve assembly 57, a third pilot valve assembly 58, and a fourth pilot valve assembly 59. Movement of cylinder 12 is accomplished by activating different pairs of the valve assemblies in a conventional manner.

Figure 5:
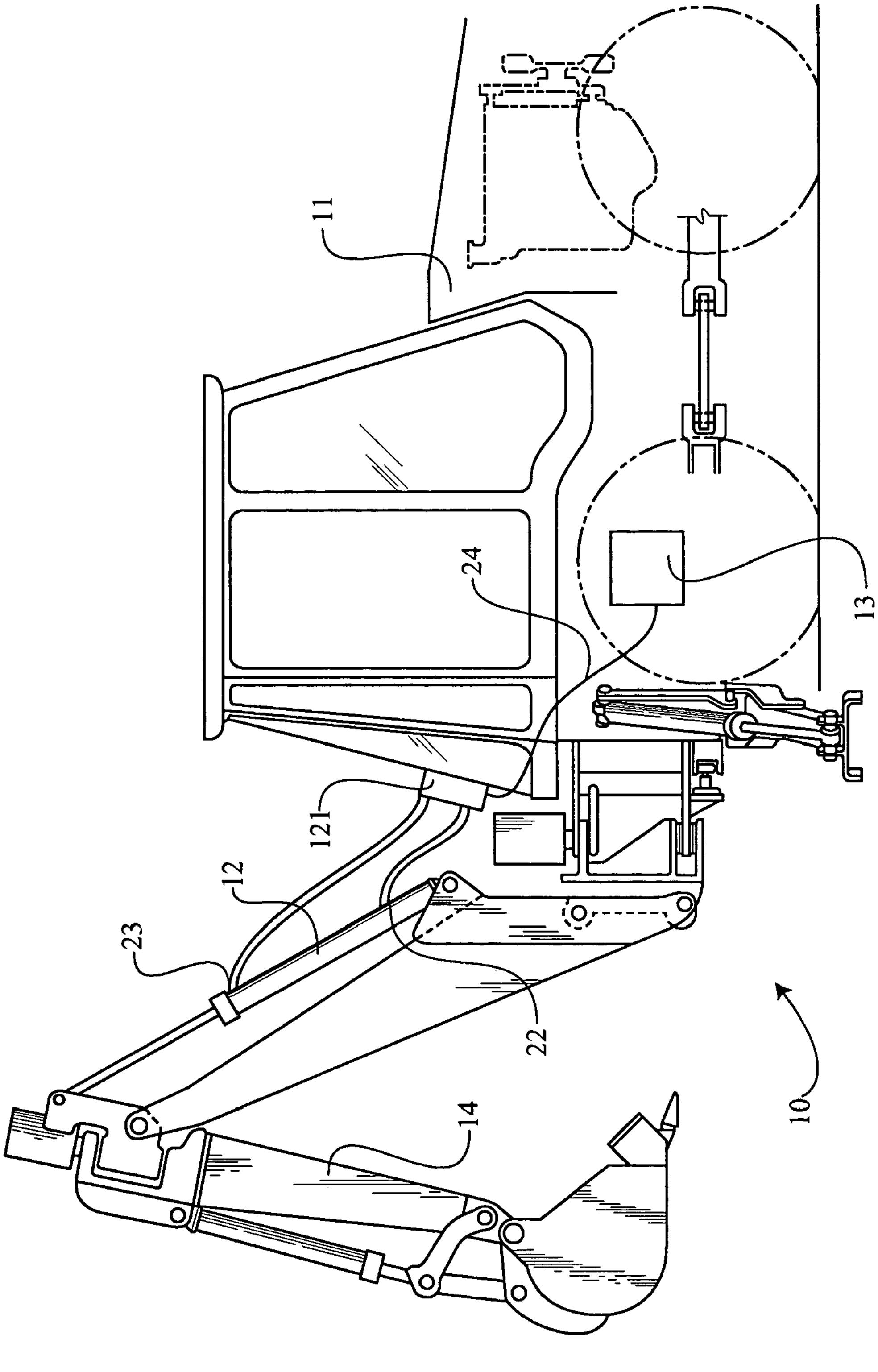
FIG. 5 is a diagrammatic view of a backhoe-type work machine including a valve assembly according to the present disclosure.

Referring to FIG. 5, a backhoe type work machine 10 is provided utilizing the valve assembly 121 herein disclosed. It will be recognized that similar elements are indicated by similar numbers to the previous Figures. The backhoe type work machine 10 includes a chassis 11, an implement 14 whose movement is controlled by a hydraulic cylinder 12 and an electronic controller 13. The valve assembly 121 is also attached to the chassis 11. As shown, the valve assembly 21 is attached to a head port 22 and a rod port 23 of the hydraulic cylinder 12. An electrical connection 24 connects the electronic controller 13 with the position sensor 60, the first pressure sensor 61 and the second pressure sensor 62 positioned inside of each poppet valve assembly 30. The electrical connection 24 also operably connects the electronic controller 13 with each pilot valve assembly 40 of the valve assembly 121.

It will be recognized by one skilled in the art that the description of the backhoe type work machine 10 is not intended to limit the spirit or scope of this disclosure, and it is envisioned that the work machine 10 could be any suitable work machine with a chassis 11, an electronic controller 13, an implement 14, and a hydraulic cylinder 12, such as a bulldozer, a compactor, or any other work machine known to those skilled in the art. Further, it should be recognized that although only one valve assembly 121 and one hydraulic cylinder 12 are discussed in this disclosure, it is contemplated that there could be more than one valve assembly 121 attached to the chassis 11, which could each control a different hydraulic cylinder 12 associated with the same or a different implement.

Referring to FIGS. 6*a*–6*d*, there is provided an example of the inter-relation between the hydraulic cylinder 12, the position of the poppet valve member 31 relative to the valve seat 32, the hydraulic pressure of the pump port 37, and the configuration of the pilot valve assembly 40. The graphs show an example procedure in opening the hydraulic cylinder 12 in two stages from 0% where the cylinder 12 is fully closed to 100% where the cylinder 12 is fully open. In this example only the first poppet valve assembly 51 and the third poppet valve assembly 53 as shown in FIG. 4 are used, along with their respective pilot valve assemblies 55, 57, because the cylinder 12 is being extended. The first pilot valve assembly 55 will move the poppet valve member 31 away from the valve seat 32 of the first poppet valve assembly 51 to fluidly connect the pump port 37 with the head port 22 of the hydraulic cylinder 12 in order for hydraulic fluid to open the hydraulic cylinder. Simultaneously, the third pilot valve assembly 57 will introduce hydraulic fluid to the control chamber 36 of the third poppet valve assembly 53 and move the poppet valve member 31 away from the valve seat 32 of the third poppet valve assembly 53, fluidly connecting the rod port 23 of the hydraulic cylinder 12 with the drain port 38 of the valve assembly 21. In this way the hydraulic fluid will drain from the rod port 23 of the hydraulic cylinder 12, allowing the hydraulic cylinder 12 to open as described in FIG. 6*a*. It will be recognized that if the hydraulic cylinder 12 were moving in the direction opposite of that described above, then the second and fourth poppet valve assemblies 52, 54 would be utilized, along with their respective pilot valve assemblies 56, 58 in a similar manner recognizable to one skilled in the art.

Figure 6A:
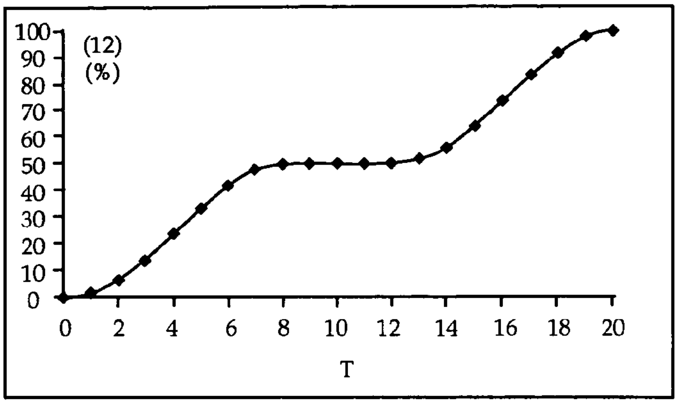
FIG. 6*a* is a graph of hydraulic cylinder position shown as a percentage as a function of time.
Figure 6B:
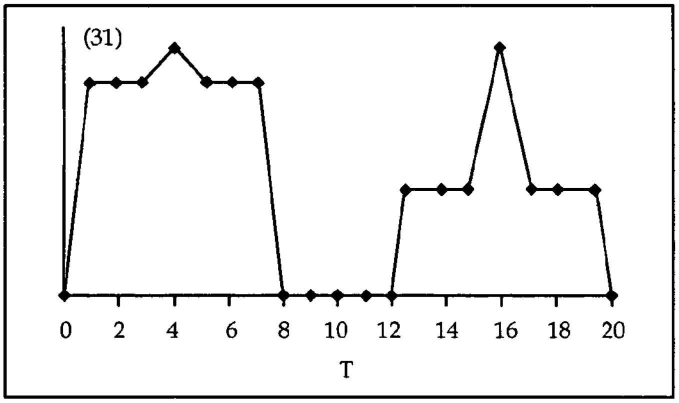
FIG. 6*b* is a graph of the position of a poppet valve member in a valve assembly coupled to the hydraulic cylinder as a function of time.
Figure 6C:
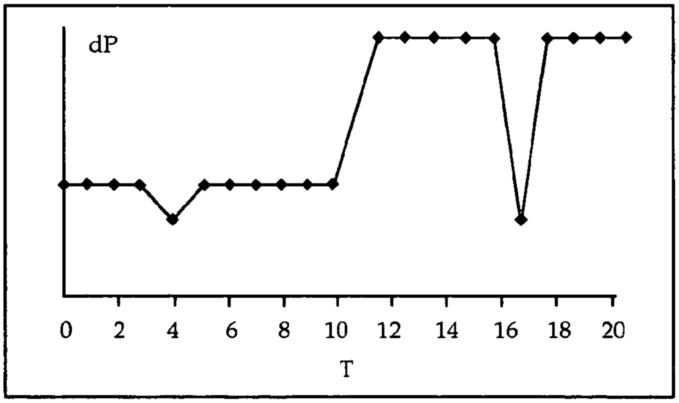
FIG. 6*c* is a graph of pressure differential across the valve seat in the hydraulic system coupled to the hydraulic cylinder as a function of time.

FIG. 6*c* shows the hydraulic pressure of the pump port 37 at some level from time t=0 to time t=3, then the hydraulic pressure temporarily decreases at t=4 and resumes at t=5 until t=10. The hydraulic pressure then increases to some higher pressure from t=10 to t=11, at which point it temporarily decreases again at t=16, but otherwise remains constant from t=11 to t=20.

Figure 6D:
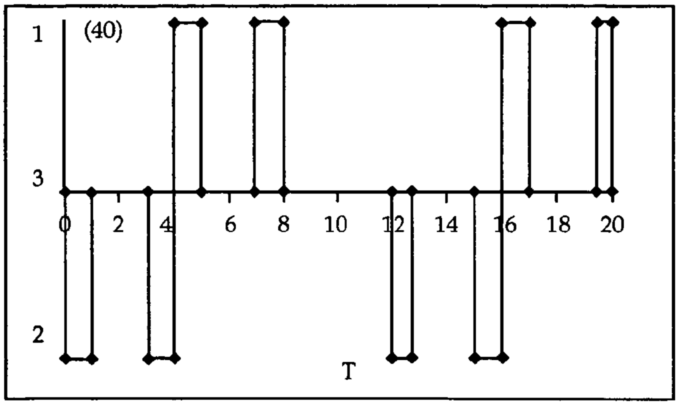
FIG. 6*d* is a graph of the configuration of a pilot valve assembly in the valve assembly as a function of time.

It will further be observed that FIG. 6*b* describes the displacement of the poppet valve member 31 from the valve seat 32 from time t=0 through t=20, while FIG. 6*d* describes the configuration of the pilot valve assembly 40. From time t=0 through t=1, FIG. 6*b* shows that the poppet valve member 31 is moving away from the valve seat 32. During this time FIG. 6*d* shows that the pilot valve assembly 40 is in the second configuration 40*b*, and FIG. 6*a* shows that the hydraulic cylinder 12 is accelerating.

From time t=1 through time t=3, FIG. 6*a* shows the motion of the hydraulic cylinder 12 to be relatively linear. During this time the poppet valve member 31 is hydraulically locked in position by the pilot valve assembly 40 in the third configuration 40*c* as shown in FIG. 6*d*. Similar movement in the hydraulic cylinder 12 is observed from time t=5 through t=7.

FIG. 6*c* shows that the hydraulic pressure drops from t=3 through t=4, and then returns to its former level from t=4 through t=5. During this time, FIG. 6*a* shows that the movement of the hydraulic cylinder 12 remains linear. FIGS. 6*d* and 6*b* illustrate that this is accomplished at least in part by the pilot valve assembly 40 moving the poppet valve member 31 further away from the valve seat 32 from t=3 through t=4, and then returning the poppet valve member 31 to its former position from t=4 through t=5. By moving the poppet valve member 31 away from the valve seat 32, the flow area across the valve seat 32 is increased, which compensates for the temporarily lowered hydraulic pressure. When FIG. 6*c* shows the hydraulic pressure level returning to normal, FIG. 6*d* shows the pilot valve assembly 40 moving the poppet valve member 31 back to its previous position in FIG. 6*b*.

From time t=7 through t=8, FIG. 6*a* shows the motion of the hydraulic cylinder 12 decreasing. During this time FIG. 6*d* shows that the pilot valve assembly 40 is in the first configuration 40*a*, which causes the poppet valve member 31 to move into contact with the valve seat 32 as shown in FIG. 6*b*. Once in contact with the valve seat 32 at time t=8, FIG. 6*d* shows that the pilot valve assembly 40 is in the third configuration 40*c*, hydraulically locking the poppet valve member 31 in position. As seen in FIG. 6*a*, during this time the hydraulic cylinder 12 remains motionless, as there is no flow area across the valve seat 32 of the valve assembly 21, even when FIG. 6*c* shows the hydraulic pressure increasing from time t=10 through t=11.

Graphs 6*a*–*d* demonstrate a similar behavior of the hydraulic cylinder 12 from time t=12 through t=20 as to the behavior observed from time t=0 through t=8, even though FIG. 6*c* shows an increase in hydraulic pressure. Despite this increase, FIG. 6*a* shows the hydraulic cylinder 12 moving at the same rate as it did previously. It will be seen by examination of FIG. 6*b* that this is because the poppet valve member 31 is displaced to a distance closer to the valve seat 32. By decreasing the displacement of the poppet valve member 31, the increased hydraulic pressure is at least partially compensated for. It will further be observed that because the hydraulic pressure is higher from time t=12 through t=12.5, the pilot valve assembly 40 needs to be in the second configuration 40*b* for a lesser amount of time to move the poppet valve member 31, as seen in FIGS. 6*b* and 6*d*. It will be noticed that the time to move the poppet valve member 31 back into position is decreased in a similar manner, as shown in FIGS. 6*b* and 6*d*. It should also be observed that when a FIG. 6*c* shows a temporary fluctuation in hydraulic pressure from time t=15 through t=17, FIGS. 6*b* and 6*d* show the pilot valve assembly 40 and poppet valve member 31 being moved to compensate in a manner similar to time t=3 through t=5. In this manner the hydraulic pressure variance is at least partially compensated for, and the motion of the hydraulic cylinder 12 remains relatively linear, as observed in FIG. 6*a*.

It will be appreciated by one skilled in the art that FIGS. 6*a*–6*d* are merely demonstrative, and are not intended to limit the spirit or scope of this disclosure in any way with respect to time or degree of motion of any element of the valve assembly 121. It is contemplated that the pilot valve assembly 40 could have different flow areas through the first configuration 40*a* and the second configuration 40*b* such that the movement of the poppet valve member 31 could be controlled with higher precision, allowing for greater uniformity in observed hydraulic cylinder 12 movement.

INDUSTRIAL APPLICABILITY

This disclosure contemplates the valve assembly 121 disclosed herein specifically to manipulate a hydraulic cylinder 12 attached to a work machine implement 14 connected to the chassis 11 of a backhoe type work machine 10 as provided in FIG. 5. In one embodiment herein contemplated, the valve assembly 121 would include a pump port 37 and a drain port 38 fluidly connected via a plurality of poppet valve assemblies 51, 52, 53, 54 to the head port 22 and the rod port 23 of the hydraulic cylinder 12.

The actuator 41 of a pilot valve assembly 40 is operable to move the pilot valve member 42 to effect either fluid connection or fluid isolation of the control chamber 36 of the poppet valve assembly 30. FIG. 1 shows that when the pilot valve assembly 40 is moved into the first configuration 40*a*, the control chamber 36 is fluidly connected to the input port 34 of the poppet valve assembly 30. This will allow pressurized hydraulic fluid to fill the control chamber 36, which will cause hydraulic pressure on the poppet valve member 31 via the control hydraulic surface 35. This will result in the poppet valve member 31 moving into contact with the valve seat 32, reducing and ultimately removing a flow area across the valve seat 32. It will be noted that the actuator 41*a* is biased such that the natural state of the pilot valve assembly 40 is in this first configuration 40*a* in order to prevent unintentional movement of the associated hydraulic cylinder 12 and work machine implement 14.

Similarly, when the pilot valve assembly 40 is in the second configuration 40*b*, the control chamber 36 is fluidly connected to the output port 33 of the poppet valve assembly 30 as shown by FIG. 2. Because the output port 33 will be at a lower pressure than the control chamber 36, hydraulic fluid will flow out of the control chamber 36, resulting in a negative pressure across the control hydraulic surface 35 of the poppet valve member 31. This will cause the poppet valve member 31 to move away from the valve seat 32, creating a flow area across the valve seat 32 between the input port 34 and the output port 33 of the poppet valve assembly.

In the third configuration 40*c*, the control chamber 36 is fluidly isolated from either the input port 34 or the output port 33 by the pilot valve assembly 40 as shown in FIG. 3. It will be recognized that because the control chamber 36 is fluidly isolated, the poppet valve member 31 is hydraulically locked into position because the hydraulic chamber 36 contains a certain amount of hydraulic fluid that will neither compress nor expand. This will result in the poppet valve member 31 being almost completely immobile regardless of changes in the pressure differential between the pump port 37 and the drain port 38 of the valve assembly 21 as shown in FIGS. 6*b* and 6*d*.

One skilled in the art will recognize that in FIG. 4 the input port 34 of the first and fourth poppet valve assemblies 51, 54 would be connected to the pump port 37, while their output ports 33 would be connected to the head port 22 and the rod port 23 of the hydraulic cylinder 12, respectively. Likewise, the output port 33 of the second and third poppet valve assemblies 52, 53 will be connected to the drain port 38 while their input ports are connected to the head port 22 and rod port 23 of the hydraulic cylinder 12, respectively.

The advantages in control from this valve assembly 121 will be apparent to one skilled in the art. It is contemplated that the work machine operator will make a control change that will be interpreted by the electronic controller 13. The electronic controller 13 will then gather data such as the pressure differential between the first pressure sensor 61 and the second pressure sensor 62, and the position of the poppet valve member 31 in relation to the valve seat 32 via the position sensor 60. The electronic controller 13 then directs the actuator 41 of the pilot valve assembly 40 to move the pilot valve member 42 in a manner as shown in FIGS. 6*b*–*d*. If the pressure differential is high, then the poppet valve member 31 will be displaced less from the valve seat 32 than if the pressure differential were low as seen in FIGS. 6*b* and 6*c*. In this manner, the fluid pressure on the hydraulic cylinder 12 will be controlled and the movement of the hydraulic cylinder 12 will be effectively the same whether the pressure differential is high or low, as shown in FIG. 6*a*. Thus, the results that the work machine operator observes will be almost uniform, however the internal positioning of the valve assembly 121 may differ. In this way the problems of difficult and unpredictable controls may be significantly lessened. An additional improvement in the current valve assembly 121 as disclosed is that a poppet valve member 31 can be moved to a location away from the valve seat 32 and hydraulically locked in place via fluid isolation of the control chamber 36 for a prolonged period of time. The valve will not inherently leak because it is not a spool valve, and because it is fluidly isolated it is de-sensitized to the pressure changes that characterized difficulties with previous poppet valve designs.

It will be appreciated that the embodiment described above is merely exemplary, and multiple other configurations involving at least one poppet valve assembly 30 and at least one pilot valve assembly 40 herein disclosed are contemplated. Those skilled in the art will appreciate that other aspects, objects, and advantages of the invention can be obtained from a study of the drawings, the disclosure and the appended claims.

What is claimed is:

1. A valve assembly comprising:

a poppet valve assembly including a poppet valve member and a fluid passage extending between a first port and a second port, and the fluid passage including a valve seat, and the poppet valve assembly having a control chamber disposed therein; and the poppet valve member includes a control hydraulic surface exposed to hydraulic pressure inside the control chamber, and the poppet valve member being movable to a position in contact with the valve seat, and the poppet valve member having a plurality of positions with different flow areas across the valve seat; and a pilot valve assembly fluidly connected to the poppet valve assembly, and having a first configuration wherein the first port is fluidly connected to the control chamber, and having a second configuration wherein the second port is fluidly connected to the control chamber, and having a third configuration wherein the control chamber is fluidly isolated from the first port and the second port.

2. A valve assembly as in claim 1 wherein the second port is fluidly isolated when the pilot valve assembly is in the first configuration, and the first port is fluidly isolated when the pilot valve assembly is in the second configuration.

3. A valve assembly as in claim 1 including a means for detecting a pressure difference between the first port and the second port.

4. A valve assembly as in claim 3 wherein the means for detecting a pressure difference between the first port and the second port includes a first pressure sensor sensitive to the pressure of the first port, and a second pressure sensor sensitive to the pressure of the second port.

5. A valve assembly as in claim 1 wherein the pilot valve assembly includes a pilot valve member operably coupled to an actuator, and the pilot valve assembly is biased to be in the first configuration.

6. A valve assembly as in claim 1 that includes a position sensor attached to the poppet valve assembly, and the position sensor is operably coupled to sense a displacement of the poppet valve member relative to the valve seat.

7. A valve assembly as in claim 6 wherein the position sensor includes a linear variable displacement transducer.

8. A valve assembly as in claim 1 wherein the poppet-valve assembly is a first poppet valve assembly and the pilot valve assembly is a first pilot valve assembly; and the valve assembly includes a second, third and fourth poppet valve assembly coupled to a second, third and fourth pilot valve assembly, respectively.

9. A valve assembly as in claim 8 wherein the first port is a pump port, the second port is a drain port, and the valve assembly includes a rod port and a head port.

10. A machine comprising:

a chassis; and a valve assembly including a poppet valve assembly, a head port, a rod port, a pump port, and a drain port, attached to the chassis; and a hydraulic cylinder fluidly connected to the head port and the rod port; and the poppet valve assembly includes a poppet valve member with a control hydraulic surface exposed to fluid pressure in a control chamber and movable to a plurality of positions with different flow areas across the valve seat; and means, including a pilot valve assembly, for stopping the poppet valve member at each of the plurality of positions at least in part by fluidly isolating the control chamber.

11. A machine as in claim 10 wherein the machine is a work machine, and the hydraulic cylinder is operably coupled to an implement of the work machine.

12. A machine as in claim 11 including an electronic controller with means for determining control signals for the pilot valve assembly at least in part as a function of a pressure difference on opposite sides of the valve seat, in operable control of the pilot valve assembly.

13. A machine as in claim 12 wherein the pilot valve assembly includes an actuator operably coupled to move a pilot valve member; and the pilot valve member can be moved to a first, second and third position; and the pilot valve member is operable to fluidly connect the control chamber to one of the head port, the rod port, the pump port and the drain port in a first configuration, and connect the control chamber to a different one of the head port, the rod port, the pump port and the drain port in a second configuration and fluidly isolate the control chamber from the head port, the rod port, the pump port and the drain port in a third configuration.

14. A machine as in claim 11 including an electronic controller operably coupled to a position sensor attached to the poppet valve assembly, and the position sensor is operably coupled to sense a displacement of the poppet valve member relative to the valve seat.

15. A machine as in claim 11 and including a first cylinder hydraulically connected to a first poppet valve assembly that is electronically controlled by the electronic controller; and the work machine also including a second cylinder hydraulically connected to a second poppet valve assembly that is electronically controlled by the electronic controller.

16. A method of operating a valve assembly comprising the steps of:

moving a poppet valve member with respect to a valve seat at least in part by exposing a control hydraulic surface of the poppet valve member to hydraulic pressure in a control chamber; and stopping the poppet valve member at a position away from the valve seat at least in part by fluidly isolating the control chamber.

17. A method of operating a valve assembly as in claim 16 wherein the step of moving the poppet valve member with respect to the valve seat includes fluidly connecting the control chamber to a port.

18. A method of operating a valve assembly as in claim 16 including a step of selecting the position of the poppet valve member based at least in part on a pressure differential on opposite sides of a valve seat.

19. A method of operating a valve assembly as in claim 18 including a step of determining the pressure differential at least in part by sensing pressure in a first port and sensing pressure in a second port.

20. A method of operating a valve assembly as in claim 18 including a step of determining the position of the poppet valve member with respect to the valve seat.

* * * * *